(12) United States Patent
Oka et al.

(10) Patent No.: US 9,418,044 B2
(45) Date of Patent: Aug. 16, 2016

(54) CONFIGURING SELECTED COMPONENT-PROCESSORS OPERATING ENVIRONMENT AND INPUT/OUTPUT CONNECTIONS BASED ON DEMAND

(75) Inventors: Masaaki Oka, Kanagwa (JP); Akio Ohba, Kanagawa (JP); Junichi Asano, Kanagawa (JP); Junichi Naoi, Tokyo (JP); Atsushi Kunimatsu, Kawasaki (JP); Jiro Amemiya, Kawasaki (JP)

(73) Assignees: SONY INTERACTIVE ENTERTAINMENT INC., Tokyo (JP); KABUSHIKI KAISHA TOSHIBA, Tokyo (JP)

( * ) Notice: Subject to any disclaimer, the term of this patent is extended or adjusted under 35 U.S.C. 154(b) by 2380 days.

(21) Appl. No.: 10/733,174

(22) Filed: Dec. 11, 2003

(65) Prior Publication Data

US 2004/0163132 A1    Aug. 19, 2004

(30) Foreign Application Priority Data

Dec. 16, 2002  (JP) ................................ 2002-363780

(51) Int. Cl.
*G06F 9/50* (2006.01)
*G06F 15/80* (2006.01)

(52) U.S. Cl.
CPC ............ *G06F 15/8007* (2013.01); *G06F 9/505* (2013.01); *A63F 2300/20* (2013.01); *A63F 2300/60* (2013.01); *A63F 2300/6063* (2013.01); *G06F 9/50* (2013.01)

(58) Field of Classification Search
CPC ... G06F 9/505; G06F 9/5027; G06F 13/1652; G06F 13/1663; G06T 2210/52; H04L 49/1576; H04L 49/101
USPC .......... 718/100, 102, 104; 712/16, 17, 20, 28, 712/32; 711/163, 169, 147
See application file for complete search history.

(56) References Cited

U.S. PATENT DOCUMENTS 3,643,227 A  *  2/1972  Smith et al. .................... 718/105
4,000,487 A  *  12/1976 Patterson et al. ............... 710/40
(Continued)

FOREIGN PATENT DOCUMENTS

| JP | 59-99575  | 6/1984  |
| JP | 4-348451  | 12/1992 |

(Continued)

OTHER PUBLICATIONS

International Search Report dated Jul. 20, 2005.
(Continued)

*Primary Examiner* — Abdullah Al Kawsar
*Assistant Examiner* — Caroline H Arcos
(74) *Attorney, Agent, or Firm* — Katten Muchin Rosenman LLP

(57) ABSTRACT

An entertainment device includes a general-purpose signal processor made up of an assembly of component-processors, each of which can operate in parallel under operating environments independent of others component-processors. A management processor controls a cross bar so as to change the operating environments of the respective component-processors in accordance with a demand for signal processing which is given from a CPU, and to change over any one of the component-processors which receives a signal to be processed which is inputted through the cross bar or outputs a processed signal in accordance with the demand for signal processing.

9 Claims, 7 Drawing Sheets

(56) References Cited

U.S. PATENT DOCUMENTS

| | | | | |
|---|---|---|---|---|
| 4,498,134 | A * | 2/1985 | Hansen et al. | 712/13 |
| 4,876,643 | A * | 10/1989 | McNeill et al. | 710/110 |
| 5,175,837 | A * | 12/1992 | Arnold et al. | 711/152 |
| 5,193,189 | A * | 3/1993 | Flood et al. | 718/103 |
| 5,220,651 | A * | 6/1993 | Larson | 710/8 |
| 5,339,396 | A * | 8/1994 | Muramatsu et al. | 710/317 |
| 5,349,680 | A * | 9/1994 | Fukuoka | 718/108 |
| 5,392,391 | A * | 2/1995 | Caulk et al. | 345/503 |
| 5,414,857 | A * | 5/1995 | Jeddeloh et al. | 710/241 |
| 5,442,789 | A | 8/1995 | Baker et al. | |
| 5,450,557 | A | 9/1995 | Kopp et al. | |
| 5,491,787 | A * | 2/1996 | Hashemi | 714/11 |
| 5,504,670 | A * | 4/1996 | Barth et al. | 700/5 |
| 5,522,083 | A * | 5/1996 | Gove et al. | 712/22 |
| 5,530,904 | A * | 6/1996 | Koga | 710/52 |
| 5,539,896 | A * | 7/1996 | Lisle | 711/150 |
| 5,630,161 | A * | 5/1997 | Branco et al. | 712/36 |
| 5,655,146 | A | 8/1997 | Baum et al. | |
| 5,657,449 | A * | 8/1997 | Osaki | 370/357 |
| 5,789,690 | A * | 8/1998 | Furuhashi et al. | 84/633 |
| 5,809,322 | A * | 9/1998 | Akerib | 712/14 |
| 5,832,303 | A * | 11/1998 | Murase et al. | 710/36 |
| 5,864,679 | A * | 1/1999 | Kanai et al. | 709/238 |
| 5,886,537 | A | 3/1999 | Macias et al. | |
| 5,926,583 | A * | 7/1999 | Iwase et al. | 382/304 |
| 5,995,505 | A * | 11/1999 | Nakasaka et al. | 370/360 |
| 6,032,174 | A * | 2/2000 | Avsan et al. | 718/108 |
| 6,038,350 | A * | 3/2000 | Iwase et al. | 382/304 |
| 6,119,217 | A * | 9/2000 | Suzuoki | 712/36 |
| 6,134,515 | A * | 10/2000 | Skogby | 703/23 |
| 6,182,206 | B1 | 1/2001 | Baxter | |
| 6,244,959 | B1 | 6/2001 | Miyamoto et al. | 463/31 |
| 6,301,603 | B1 * | 10/2001 | Maher | G06F 9/5044 700/94 |
| 6,631,962 | B2 | 10/2003 | Rehmann et al. | |
| 6,910,085 | B2 * | 6/2005 | Takaku et al. | 710/62 |
| 7,062,768 | B2 * | 6/2006 | Kubo et al. | 718/105 |
| 7,072,990 | B2 * | 7/2006 | Takaku et al. | 710/8 |
| 7,076,576 | B2 | 7/2006 | Nishimura et al. | |
| 7,080,010 | B2 * | 7/2006 | Shlomot et al. | 704/229 |
| 7,318,164 | B2 * | 1/2008 | Rawson, III | 713/320 |
| 7,336,677 | B2 * | 2/2008 | Cheung et al. | 370/419 |
| 2001/0005206 | A1 * | 6/2001 | Ohba | 345/419 |
| 2001/0008847 | A1 * | 7/2001 | Miyamoto et al. | 463/33 |
| 2002/0068626 | A1 * | 6/2002 | Takeda et al. | 463/30 |
| 2002/0068636 | A1 * | 6/2002 | Nojiri et al. | 463/47 |
| 2002/0083111 | A1 * | 6/2002 | Row et al. | 709/1 |
| 2002/0116351 | A1 * | 8/2002 | Skaanning | G06N 7/005 706/21 |
| 2002/0138707 | A1 * | 9/2002 | Suzuoki et al. | 711/163 |
| 2002/0138716 | A1 | 9/2002 | Master et al. | |
| 2003/0005073 | A1 | 1/2003 | Yoshizawa et al. | |
| 2003/0020771 | A1 | 1/2003 | Rehmann et al. | |
| 2003/0023906 | A1 | 1/2003 | Nishimura et al. | |
| 2003/0115495 | A1 * | 6/2003 | Rawson, III | 713/324 |
| 2003/0200249 | A1 * | 10/2003 | Gorgone et al. | 709/102 |
| 2003/0204551 | A1 * | 10/2003 | Chen | 709/102 |
| 2003/0225814 | A1 * | 12/2003 | Saito et al. | 709/105 |
| 2004/0085321 | A1 * | 5/2004 | Oka et al. | 345/501 |
| 2004/0088393 | A1 * | 5/2004 | Bullen et al. | 709/223 |

FOREIGN PATENT DOCUMENTS

| | | |
|---|---|---|
| JP | 7-141305 | 6/1995 |
| JP | 9-160890 | 6/1997 |
| JP | 9-509773 | 9/1997 |
| JP | 10-162130 | 6/1998 |
| JP | 10-232788 | 9/1998 |
| JP | 11-65862 | 3/1999 |
| JP | 2001-117893 | 4/2001 |
| JP | 2003-67355 | 3/2003 |
| WO | 95-09399 | 4/1995 |

OTHER PUBLICATIONS

Notice of Reason(s) of Refusal, dated Apr. 3, 2007, for Corresponding Japanese Application No. 2002-363780.
Notice of Reason(s) of Refusal, dated Feb. 23, 2010, for Corresponding Japanese Application No. 2002-363780.
Takashi Matsuyama, et. al, "Designing Data Level Parallel Processes for Object Recognition on Recursive Torus Architecture", Journal of Information Processing Society of Japan, Information Processing Society of Japan, Oct. 15, 1995, vol. 36, No. 10, pp. 2310-2320.
Masakazu Sekijima, et. al, "Parsley: A Scalable Framework for Dependence-driven Subtask Scheduling in Distributed-memory Multiprocessor Systems", Journal of Information Processing Society of Japan, Information Processing Society of Japan, Mar. 15, 2000, vol. 41, No. SIG2(PRO6), pp. 65-77.
Questioning, dated Jul. 21, 2009, for Corresponding Japanese Application No. 2002-363780.
Takayoshi Shimizu, "ES7000 Integrated Management Environment Server Navigation Tool", UNISYS Technology Review, Nihon Unisys Ltd., Nov. 30, 2002, vol. 22, No. 3, pp. 144-154.
Communication pursuant to Article 96(2) EPC, dated Dec. 29, 2005, for corresponding EPC Application No. 03 778 866.8.
Communication pursuant to Article 94(3) EPC, dated Jan. 21, 2009, for corresponding EPC Application No. 03 778 866.8.
Korean Notice of Reason(s) for Refusal, dated Sep. 26, 2006, for corresponding Korean Application No. 2005-7010841.

* cited by examiner

CONFIGURING SELECTED COMPONENT-PROCESSORS OPERATING ENVIRONMENT AND INPUT/OUTPUT CONNECTIONS BASED ON DEMAND

CROSS REFERENCE TO RELATED APPLICATION

The present application claims priority from Japanese Application No. 2002-363780 filed Dec. 16, 2002, the disclosure of which is hereby incorporated by reference herein.

BACKGROUND OF THE INVENTION

1. Field of the Invention

The present invention relates to an entertainment device that can execute integrative processes regarding plural kinds of processes pertained to multimedia such as an image or a sound, and structural parts of the entertainment device.

2. Description of the Related Art

As the communication and network technologies develop, an entertainment device, such as a digital broadcast set-top box or a home server that links a plurality of domestic devices, is becoming more popular.

FIG. 8 is a structural view showing a home server which is an example of the entertainment device. The home server is made up of various processor units such as a CPU (central processing unit), a GPU (graphics processing unit), an IPU (image processing unit) or a SPU (sound processing unit), a memory such as a RAM (random access memory), a network interface or a storage such as a hard disk device. The respective processor units read and execute a given computer program, respectively, to thereby realize various functions such as receiving, decoding, compression, decompression of data distributed through a network, distribution of data to a domestic network, or transmitting of data to the network.

The IPU is a specialized processor unit for executing image processing such as the decompression or decoding of compressed data, or the filtering or matching of an image at a high speed. The GPU is a processor for rendering, which may be called "graphic engine". An SPUout is a processor unit for processing a sound output, which executes the filtering or effecting of a sound. An SPUin is a processor unit for executing a sound input, which executes sound band limit processing or high-speed Fourier transform processing.

The home server thus structured establishes various functions within the server in accordance with an application program. Hereinafter, the operation of the home server in the case where the application program for a game, a video and sound distribution and an image and sound communication is applied to the home server will be described.

1. Game

The CPU downloads a game program and data from a game server on a network in cooperation with a given basic program or an operating system, and then stores the game program and data thus downloaded in a storage. The CPU executes a game program stored in the storage and generates image data and sound data Then, the CPU transfers those image data and sound data to the GPU and the SPUout. The GPU generates an image on the basis of the image data, and the SPUout generates a sound on the basis of the sound data. A user plays a game while watching the generated image and sound, and operates the controller or the like if required. The operation data thus generated is inputted to the home server through an IO and influences on a progress on the game.

2. Video and Sound Distribution

The CPU downloads video data and sound data from a video server on a network in cooperation with a given basic program, and then stores the video data and sound data thus downloaded in a storage. The CPU reads the data stored in the storage, executes a given program recorded in a memory, and decodes the video and sound data to generate video and sound data. Then, the CPU transfers the video and sound data to the GPU and SPUout so as to display the video on a display through the GPU and output the sound from a speaker or the like through the SPUout. As a result, the user can watch the video and sound.

3. Communication Using Image and Sound

The IPU processes a digital moving image which is shot by a user using imaging device such as a digital movie camera. A band limit, a motion search and so on are executed through the image processing. The CPU compresses the digital moving image in accordance with the processing results of the IPU, and sends the compressed image to the network from the IO.

When a recipient who possesses the home server having the same function receives the above compressed video data from the network, the CPU in the home server executes the decompression program on the memory to decompress the received video data, and transmits the image thus decompressed to the IPU. The IPU executes the image processing on the image that has been subjected to decompression to generate video data whose image quality has been improved. The video derived from the video data is displayed on the display through the GPU. Likewise, the sound is compressed at a transmit side and decompressed at a receive side, and the sound thus obtained is outputted from a speaker or the like through the SPUout.

The substantially same operation as the home server is applied to a set-top box except that a connection manner with an external device is different.

The conventional home server selectively employs the GPU, the IPU, the SPUout, and the SPUin according to a user's demand, that is, the contents of the application program to be executed. However, there is a case in which plural kinds of application programs must be executed at the same time. For example, there is a case in which an image communication is required while the user is playing a game. In this situation, the respective processor units are required to execute plural pieces of processing as follows:

1) The GPU executes the image generation for a game and the image generation for image communication.

2) The IPU executes the input image processing for communication and the output image processing.

3) The SPUout executes the output sound processing for the game and the output sound processing for the communication.

4) The SPUin executes the input sound processing for the game and the input sound processing for the communication.

In order to thus execute the image processing and the image generation, or the sound output processing and the sound input processing at the same time, respectively, the simplest solution is to provide a plurality of IPUs, and also providing a plurality of the GPUs and the SPUs. However, in this event, in the case where plural kinds of processing are not conducted at the same time, i.e., only a single piece of processing is executed, many resources are not used, this is very inefficient. On the other hand, in case plural kinds of processing are executed in a single processor unit, there arise the following problems.

1) Lack of Performance

For example, in the case where image processing that is processed by the IPU is executed by a general-purpose processor unit, the amount of calculation for image processing is enormous, and the amount of calculation largely varies according to the kind of image to be processed or the contents of processing, as a result, the number of calculating units is insufficient for the amount of calculation. Also, since the single processor is employed, multiple access is not permitted As a result, sufficient performance can not be obtained, and plural kinds of processing cannot be executed at the same time.

2) Difficulties of Performance Estimate

In a mode where plural kinds of processing are executed by a single processor unit, such processing should be time-division process. For that reason, in this mode, because a change in a period of time required for one processing influences another processing, there is a case in which an estimated processing period of time for single processing is different from an actual processing period of time Also, the cash miss frequency in the process using single processor is remarkably different from that in the process using multiple processor employing common same resource, therefore, it is difficult to estimate the performance of the mode.

SUMMARY OF THE INVENTION

The present invention has been made in view of the above circumstances, and therefore an object of the present invention is to provide an entertainment device which is capable of executing plural kinds of processing with a high efficiency and a high reliability, and a structural part thereof.

In order to achieve the above object, according to one aspect of the present invention, the present invention provides an entertainment device including a signal processing device, and a main device that provides a demand for signal processing to the signal processing device.

The signal processing device includes a general-purpose signal processor, a management processor, and an input/output interface. The general-purpose signal processor is made up of the assembly of component-processors. Each of the component-processors can operate in parallel under the operating environments independent of other component-processors, respectively. The input/output interface inputs a signal to be processed from the external device or any one of the component-processors, and outputs a processed signal to the external device or any one of the component-processors. The management processor sets the operating environments of the respective component-processors in accordance with the signal processing demand provided from the main processor, and controls the input/output interface so as to swap a component-processor, which is for receiving the signal to be processed inputted through the input/output interface or a component-processor for outputting the processed signal, in accordance with the signal processing demand.

In the entertainment device thus structured, since the operating environments of the respective component-processors can be changed in accordance with the type and/or quantity of demand of signal processing, plural kinds of processing can be executed even in the same hardware structure. Also, since the respective component-processors can be connected to each other through the input/output interface, cooperation processing can be executed among the component-processors by mutually using the plural kinds of signal processing results. Also, it is easy to deal with input/output signals in which plural kinds of data such as image data or sound data is interleaved. In addition, since each component-processors independently operates, the estimate of the respective processing performances becomes easy since a component-processor's processing performance do not influence other component-processor's processing performance.

In other aspect of the present invention, it is possible that digital information is received from an external server or the like by connection with the network to determine the type and/or quantity of demand for signal processing. In this case, the entertainment device further includes a network interface that enables a connection with a computer network, and a storage means for storing digital information readable by a computer. Then, the main processor controls the network interface, acquires the digital information from the external device, and stores the acquired digital information in the storage means. The main processor also provides the stored digital information and the demand for signal processing based on the digital information to the management processor in the signal processing device, to thereby construct the operating environments for entertainment processing whose contents are determined in accordance with the digital information on one or a plurality of component-processors.

In the entertainment device thus connectable to the network, preferably, the main processor constructs the operating environments for entertainment processing on one or more component-processors through the management processor, the main processor, upon receipt of other digital information, reconstructs the operating environments, which have been already constructed, into new operating environments on the basis of the different digital information.

The digital information may be comprised of, for example, plural kinds of application programs that can realize required functions, respectively. In this case, the management processor is structured for assigning function to the respective component-processors and for reading the application program for executing the assigned function from the storage for execution. From the viewpoint of preventing a situation in which the process assigned to a subject component-processor is suspended by the process of other component-processors, each of the component-processors operates to solely execute the application program that realizes the assigned function until another demand is provided to the management processor.

According to another aspect of the present invention, there is provided a signal processing device available as the entertainment device. The signal processing device comprises a general-purpose signal processor and a management processor. The general-purpose signal processor is made up of the assembly of component-processors, and each of the component-processors can operate under the operating environments independent of other component-processors, respectively, and the management processor can arbitrarily change the operating environments of the respective component-processors in accordance with the demand for signal processing.

From another aspect for adapting the signal processing device to an intended use for obtaining various signal processing in cooperation with an external device, the signal processing device further includes an input/output interface that inputs a signal to be processed from the external device or any one of the component-processors and outputs a signal that has been processed to the external device or any one of the component-processors. In this case, the management processor controls the input/output interface so as to swap a component-processor, which is for receiving the inputted signal to be processed and for outputting the processed signal, in accordance with the signal processing demand. The input/output interface includes, for example, the external device and any one of the component-processors, or a cross-bas switch that can selectively connect the component-processors to each other, or includes the external device and any one of the component-processors or a multiplex bus that can selectively connect the component-processors to each other.

In a preferred embodiment, a local memory is disposed in each of the component-processors, and the signal to be processed by the component-processor or the signal processed result is stored in the local memory in each of the component-processors until the signal or result stored in the local memory can be outputted to the input/output interface.

The general-purpose signal processor, the management processor and the input/output interface may be formed of a signal processing device housed in one package casing. The package casing is formed with at least a first connection interface that enables a connection with a device which provides a demand for signal processing to the management processor and a second connection interface that enables a connection with the external device which receives and transmits a signal with respect to the input/output interface.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Now, a description will be given in more detail of preferred embodiments with reference to the accompanying drawings.

Structure of an Entertainment Device: Home Server

Figure 1:
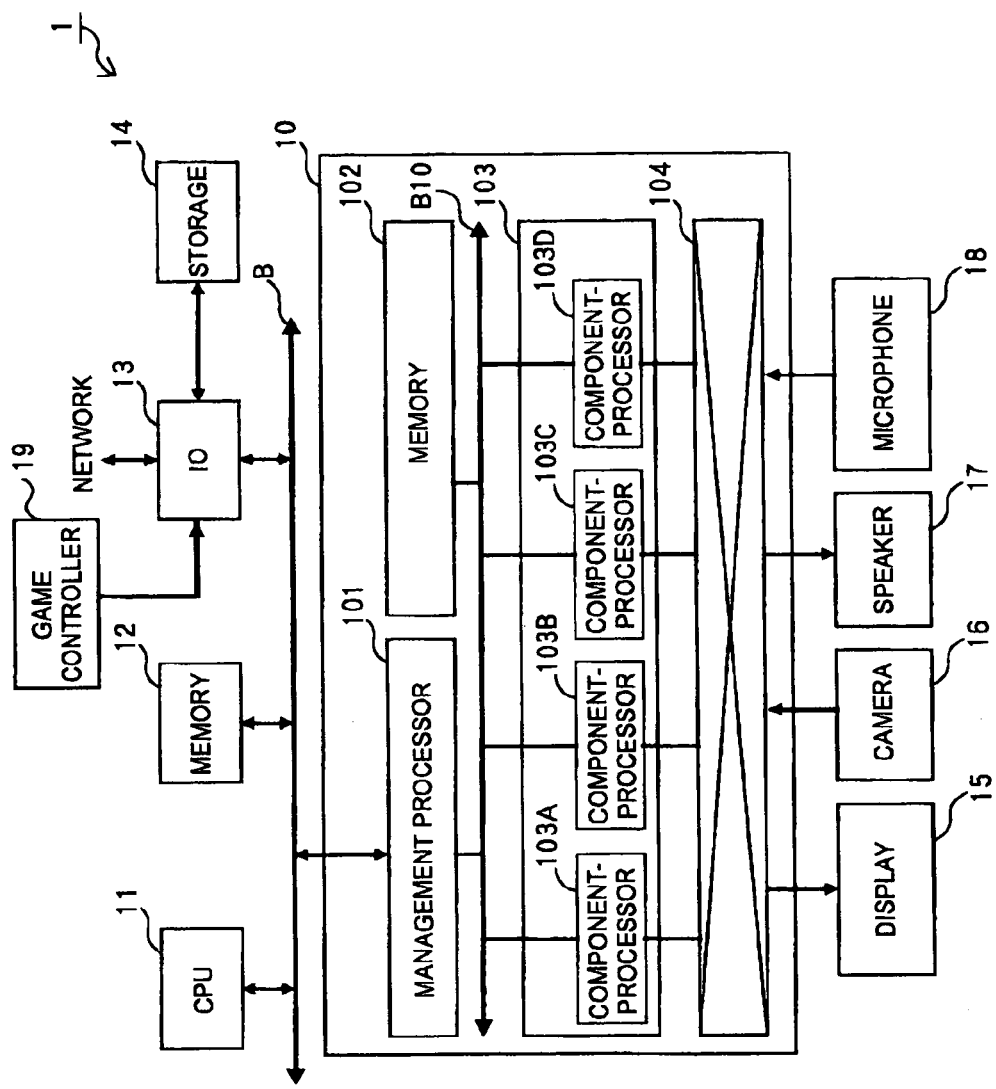
FIG. 1 is a structural diagram showing a home server to which the present invention is applied.

Referring to FIG. 1, a structural diagram for a home server, which is an example of an entertainment device, is shown.

A home server 1 is structured in such a manner that a signal processing device 10 according to the present invention, a CPU 11 and a memory 12 which are mounted on a board, and an 10 (input/output) 13 which is an example of a network interface are connected to a common bus B. The IO 13 can be connected with a computer network such as an internet, and is also connected with a storage 14 such as a hard disk device. The CPU 11, the memory 12 and the IO 13 which serve as hardware are formed of the same parts as those of the above-described conventional home server. In the memory 12, a control program (operating system, etc.) readable by the CPU 11, and various executable programs (compression, decompression, encoding, decoding, and other utility programs) are stored. The CPU 11 controls the signal processing device 10 and the IO 13 in accordance with those program to construct the execution environments of various application programs for entertainment processing.

The signal processing device 10 functions as a so-called general-purpose processing circuit that changes its configuration (operating environments) in accordance with a type, and/or quantity of demand, to thereby selectively execute plural kinds of processing, in cooperation with application interchangeable with hardware. The hardware structure for achieving the above operation is shown in the figure. That is, the management processor 101, the internal memory 102 and the general-purpose signal processor 103 are connected to an internal bus B10 within one package casing, and the genera-purpose signal processor 103 is connected with a cross bar 104 which is an example of the input/output interface.

The management processor 101 reads and executes the management program recorded in the internal memory 102, to thereby control the operation of the respective parts including the internal bus B10 of the signal processing device 10, data that is transmitted through the common bus B, etc., and executes a part of the functions of the home server in cooperation with the CPU 11. Also, the management processor 101 executes a program that is transferred from the CPU 11, and transfers a part or all of the programs transmitted from the CPU 11 to the general-purpose signal processor 103. Alternatively, the management processor 101 may have a function that discriminates the contents to be processed, and acquires and executes a required program from the memory 12 on the common bus B.

The general-purpose signal processor 103 is made up of the assembly of four component-processors 103A to 103D which can operate under the operating environments independent of each other. In this specification, "the operating environments independent of each other" mean that the operating environments do not depend on the operating environments of other component-processors. It is possible to operate two or more processor so that the both component-processors process the same contents in parallel at the same timing. Also, it is possible that any one of the component-processors operates in cooperation with another processor.

Figure 2:
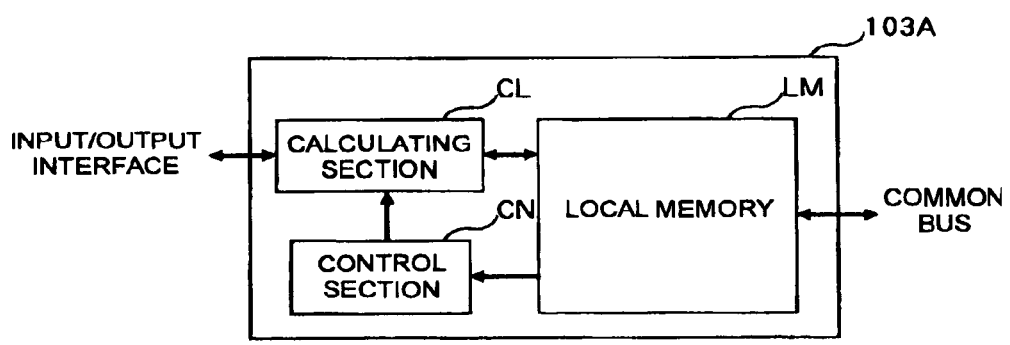
FIG. 2 is a structural diagram showing respective component-processors that constitute a signal processing device.

As shown in FIG. 2, each of the component-processors 103A to 103D are structured such that a control section CN controls a calculating section CL to conduct calculation on the basis of digital information recorded in a local memory LM, and the calculation results are temporarily stored in the local memory LM. The contents of calculation depend on the contents of digital information. For example, calculation for image processing, calculation for sound processing, calculation for communication processing, and so on are executed by the component-processors 103A to 103D.

The digital information includes, for example, a program and data which are transferred from the management processor 101, or a program and data acquired by requesting the management processor 101 by the component-processor per se. The program and data transmitted from the management processor 101 includes a program and data acquired by the management processor 101 per se, and a program and data that have been transferred to the memory 12 by the CPU 11 and further transferred by the management processor 101.

The processing results executed by the respective component-processors 103A to 103D are mutually received and transmitted between the respective component-processors 103A to 103D through the cross bar 104. Depending on the contents of the program, there is a mode in which a component-processor that has processed the program and data temporarily stores the processed results, and another component-processor that receives the processed results picks up the processed results from the internal memory 102.

When the general-purpose signal processor 103 is made up of the assembly of the component-processors 103A to 103D as described above, a different kind of processing or function can be assigned to each of the component-processors. Since an assigning manner can be freely selected, the waste of resources is lessened. The conventional specialized processor cannot achieve the above flexible manner processing. The number of component-processors that constitute the general-purpose signal processor 103 may be determined in accordance with a format and performance required for entertainment processing.

The cross bar 104 may be formed of a small-sized cross bar designed for a semiconductor chip. The cross bar 104 designates an address of a cross point of input and output lines to arbitrarily swap a connection of the input and output lines. The designation of the address may be conducted as initial processing of the CPU 11 in advance, or may be conducted by the management processor 101 in accordance with the contents of processing to be conducted. Also, the designation of the address may be conducted directly by the general-purpose signal processor 103 of the signal processing device 10 during a process assigned to the general-purpose signal processor 103, or may be assigned by requesting the management processor 101 or the CPU 11.

The cross bar 104 is also so designed as to be connected with peripheral devices such as a display 15, a camera 16, a speaker 17, a microphone 18 or a game controller 19, which is an example of the external device, through an interface such as a USB (universal serial bus) which can automatically recognize the type of device, respectively.

The bus structure in FIG. 1 is described for the purposes of an example, and various structures different from the structure shown in FIG. 1 can be applied in implementing the present invention. For example, it is possible to apply, to the present invention, a structure in which the internal bus B10 and the cross bar 104 within the signal processing device 10 are integrated with each other, or a structure in which the common bus B, the internal bus B1 and the cross bar 104 are integrated with each other.

(Operation of Home Server)

Now, the operation of the home server 1 thus structured will be described below. In this specification, for convenience of description, an operating example of the home server for a game, a video distribution, and an image and sound communication, which has been described with reference to the conventional example, will be described.

1. Game

A procedure for executing a game program by the home server 1 will be described below.

The CPU 11 reads a control program and a program of an execution form which are recorded in the memory 12, and changes the configuration (operating environments) of the signal processing device 10 to the configuration for a game in cooperation with those programs. In this situation, a part or all of the programs of the execution form is allowed to arrive at the internal memory 102 of the signal processing device 10.

In the signal processing device 10, the management processor 101 estimates a load for the game and the contents to be processed on the basis of the program of the internal memory 102. Then, the management processor 101 determines the number of component-processors to be operated in accordance with the estimated results, and constructs the operating environments for the game in those component-processors.

For example, in the case where the game accompanies an image and a sound as the contents, and image generation, image processing and sound output processing are required to be executed, the management processor 101 transfers an image generation program to first and second component-processors 103A and 103B, transfers an image processing program to a third component-processor 103C, and transfers a sound output program to a fourth component-processor 103D, so as to make the respective programs executable.

The CPU 11 then controls the IO 13 so as to download a game program and data from a game server (not shown) on a network, and then stores the game program and the data in the storage 14.

Upon the completion of downloading, the CPU 11 reads the game program stored in the storage 14, and executes the game program. In this situation, the CPU 11 transfers the image data to the first and second component-processors 103A and 103B through the internal bus B10, and transfers the sound data to the fourth component-processor 103D through the internal bus B10, to thereby generate an image and a sound.

The image generated in the first and second component-processors 103A and 103B is transferred to the third component-processor 103C through the internal bus B10, then subjected to post-processing such as filtering, and thereafter outputted from the display 15 from the cross bar 104. The sound generated from the fourth component-processor 103D is outputted from the speaker 17 through the cross bar 104. The internal bus B10 and the cross bar 104 are controlled by the management processor 101.

The user plays the game while watching the image and sound thus generated, and operates the game controller 19 or the like if necessary. The operation data obtained by operating the game controller 19 influences on the progress of the game program which is being executed by the CPU 11.

2. Video and Sound Distribution

A procedure for watching the video and sound by the home server 1 will be described below.

The CPU 11 changes the configuration of the signal processing device 10 to the configuration for a video distribution in cooperation with a control program and a program of an execution form which are recorded in the memory 12. In this situation, a part or all of the programs of the execution form is allowed to arrive at the internal memory 102 of the signal processing device 10.

In the signal processing device 10, the management processor 101 estimates a load of the entire processing and the kind of processing and determines the number of component-processors to be operated on the basis of the program of the internal memory 102, and constructs the operating environments for the video and sound distribution in those component-processors.

For example, in the case where a load of image processing is relatively large with respect to the image generation of a video to be distributed, the management processor 101 transfers an image generation program to the first component-processor 103A through the internal bus B10, transfers an image processing program to the second and third component-processor 103B and 103C through the internal bus B10, and transfers a sound output program to the fourth component-processor 103D through the internal bus B10, so as to make the respective programs executable.

The CPU 11 then controls the IO 13 so as to download the video and sound data from a video server (not shown) on the network, and then stores the video and sound data in the storage 14. Upon the completion of downloading, the CPU 11 decodes and decompresses the video and the sound in accordance with the program of the execution form while reading the video and sound data from the storage 14, to thereby execute video data and sound data. Then, the CPU 11 transfers the video data to the second and third component-processors 103B and 103C through the internal bus B10, and subjects the video data to post-processing such as filtering, to thereby generate a video. The CPU 11 also generates a caption and user interface image data, and transmits the caption and user interface image data to the first component-processor 103A through the internal bus B10, to thereby generate a caption and user interface picture. The CPU 11 further generates the video data to the first component-processor 103A from the second and third component-processors 103B and 103C through the internal bus B10, and compounds the video data and the caption and user interface picture together to output the compounded data to the display 15 through the cross bar 104. The CPU 11 transmits the sound data to the fourth component-processor 103D through the internal bus B10, and outputs the sound data to the speaker 17 through the cross bar 104. Similarly, in this case, the internal bus B10 and the cross bar 104 are controlled by the management processor 101. Through the above processing, the user can watch the video with the sound.

3. Image and Sound Communication

A procedure for communication using an image and a sound by the home server 1 will be described below. It is assumed that the home server 1 according to this embodiment is connected to transmit and receive sides through the network.

The CPU 11 in the home server 1 at each of the transmit and receive sides changes the configuration of the signal processing device 10 to an image and sound communication configuration in cooperation with various programs recorded in the memory 12 on the basis of an instruction from, for example, an input device not shown or the game controller 19. In this situation, a part or all of the program stored in the memory 12 is allowed to arrive at the internal memory 102 of the signal processing device 10 through the common bus B and the internal bus B10.

In the signal processing device 10, the management processor 101 estimates a load of the entire processing and the kind of processing and determines the number of component-processors to be operated on the basis of the program of the internal memory 102, and constructs the operating environments for the image and sound distribution in those component-processors.

For example, the management processor 101 transfers an image generation program to the first component-processor 103A through the internal bus B10, transfers an image processing program to the second component-processor 103B through the internal bus B10, transfers a sound output program to the third component-processor 103C through the internal bus B10, and transfer a sound input program to the fourth component-processor 103D so as to make the respective programs executable.

The CPU 11 of the home server 1 at the transmit side scans an image picked up by the camera 16 through the cross bar 104, and subjects the second component-processor 103B to image processing. Band limiting, motion search and so on are conducted by the above image processing. The CPU 11 receives the results of the image processing made by the second component-processor 103B through the internal bus B10 and the common bus B, compresses the pickup image in accordance with the image processed results, and thereafter transmits the compressed pickup image to the network from the IO 13.

The home server 1 at the receive side receives the compressed video data from the network, and decompresses the received video data through the processing of the CPU 11. Then, the home server 1 transfers the decompressed image to the first component-processor 103A through the common bus B and the internal bus B10, and displays a video obtained by transferring on the display 15 through the cross bar 104.

The home server 1 at the transmit side is inputted the sound from the microphone 18 through the cross bar 104, and sound processing is executed by the fourth component-processor 103D. The CPU 11 acquires information processed by the fourth component-processor 103D through the internal bus B10 and the common bus B, compresses the sound by using the processed information, and transmits the compressed sound to the network through the IO 13.

The home server 1 at the receive side receives the compressed sound data from the network, and stores the received sound data in the storage 14. The CPU 11 decompresses the sound data stored in the storage 14, transfers the decompressed image to the third component-processor 103C through the internal bus B10, and then displays a video obtained by transferring through the cross bar 104. Similarly, in this case, the internal bus B10 and the cross bar 104 are controlled by the management processor 101.

In the above example, the description was given assuming that the operating environments for a game, the operating environments for a video and sound distribution, and the operating environments for an image and sound communication are formed in the respective component-processors by transferring the programs for the various component-processors which have been transferred from the CPU 11 to the corresponding component-processors and executing the transferred programs by the management processor 101, respectively. Alternatively, the programs for the various component-processors may be read from the memory 12 and transferred by the management processor 101 per se. Similarly, the data to be processed by the respective component-processors 103A to 103D may be read from the memory 12 and transferred by the management processor 101, or may be obtained by requesting the managing processor 101 by the component-processors 103A to 103D.

4. Simultaneous Execution of Plural Kinds of Applications

Figure 3:
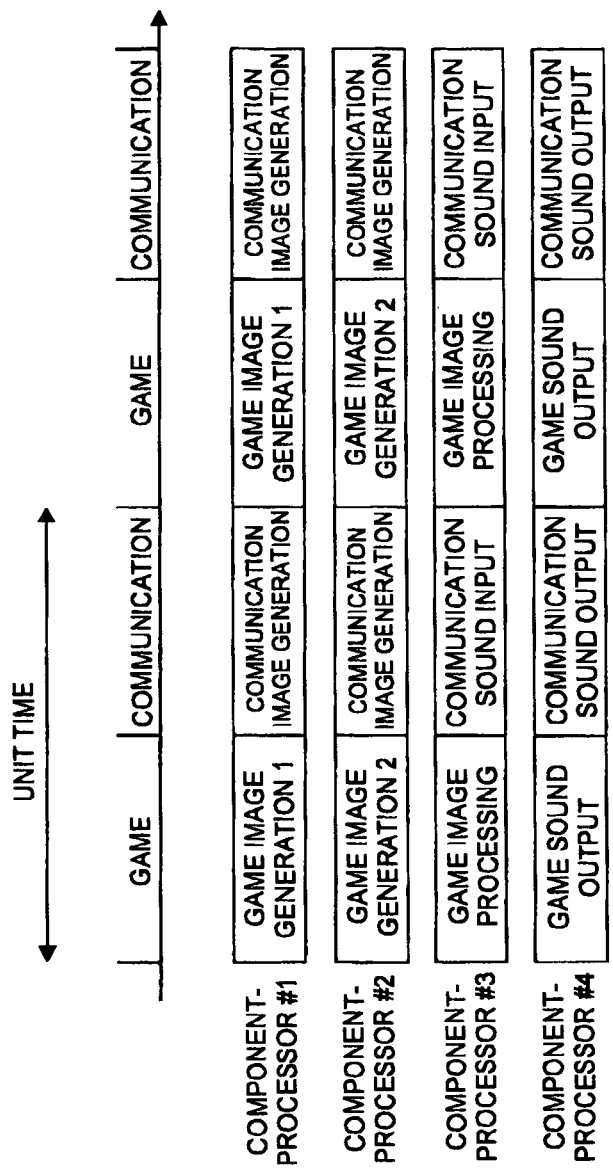
FIG. 3 is an explanatory diagram showing a state in which plural kinds of applications are conducted at the same time.
Figure 4:
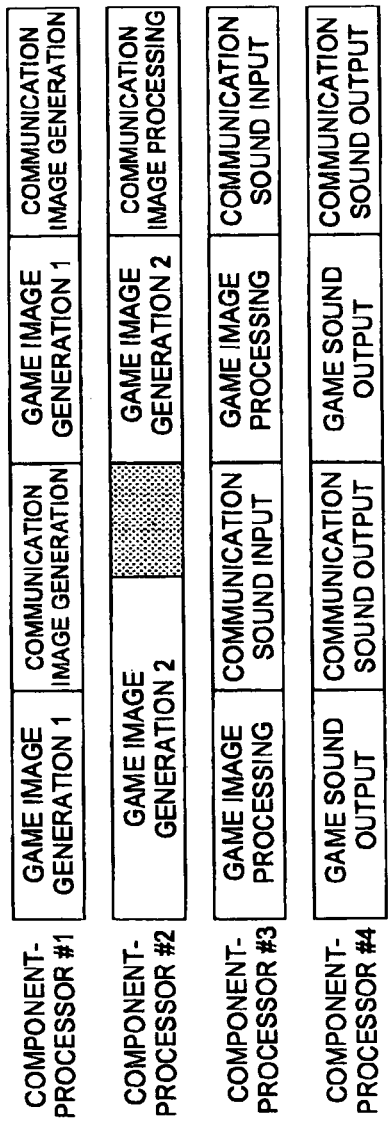
FIG. 4 is an explanatory diagram showing a trouble state when a plurality of applications are changed over and executed by the component-processors.

For example, in the case where the game and the image and sound communication as described above are executed at the same time, when the combination of those applications changes over by time division as shown in FIG. 3, there may occur such a drawback that if one processing period of time for the game or the image and sound communication is extended, the other processing period of time becomes insufficient. For example, an originally scheduled period of time for the communication image processing becomes short, or the communication image processing cannot be executed. A portion indicated by oblique lines in FIG. 4 shows this state (a state in which the communication image processing is short.

Figure 5:
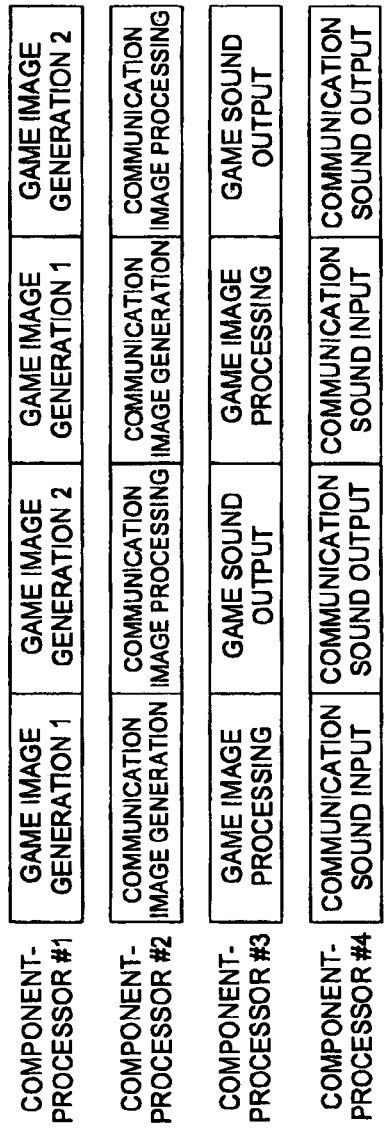
FIG. 5 is an explanatory diagram showing a state in which the same processing is assigned to each of the component-processors when conducting plural kinds of applications at the same time.

To eliminate the above drawback, in this embodiment, as shown in FIG. 5, the respective component-processors 103A to 103D only executes the programs for executing the functions assigned to the respective component-processors 103A to 103D until another demand, that is, an instruction of another application (program, etc.) is given from the management processor 101. That is, the respective component-processors are always employed by the same application.

Figure 6:
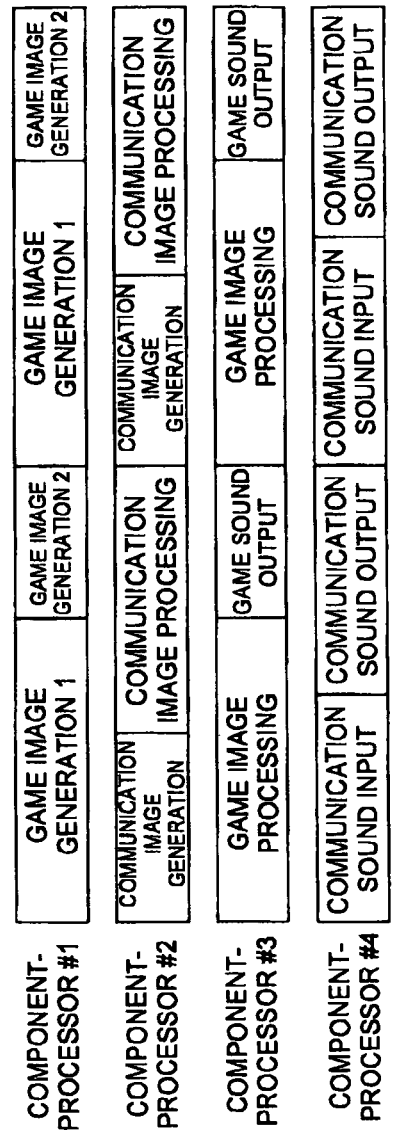
FIG. 6 is an explanatory diagram showing that there occurs no trouble in a processing mode shown in FIG. 5.

With the above manner, even if the processing period of time changes, since a load of the processing period of time can be balanced in the same application as shown in FIG. 6, the total processing period of time can be within a given period of time.

As described above, according to the home server 1 of this embodiment, the configuration (operating environments) of the general-purpose signal processing device 10 dynamically changes in accordance with a required performance, and some of various processing such as the image generation, the image processing or the sound input/output processing can be selectively or simultaneously executed by the signal processing device 10. Thus an efficient signal processing is achieved.

Also, since the respective component-processors 103A to 103D operate independently so as not to be influenced by other processing, it is easy to estimate the performance of the respective processing. When a local memory of a relatively large capacity for temporarily storing the processed results is added to each of the component-processors so as to suppress the overhead of a memory access when executing the cooperative processing of plural component-processors, it is easier to estimate the performance of the respective processing.

In addition, it is easy to deliver the processed results between plural kinds of processing such as the input and output of an image, an image or a sound, and it is also easy to process an input and output which have been interleaved with plural kinds of data such as image data or sound data. As a result, the generation of the multimedia contents of various expression modes, and high-level image processing by simultaneous formation of plural functions are readily achieved. On the other hand, the information processing of relatively simple contents can be executed at a high speed by operating all of the component-processors 103A to 103D at the same timing.

Figure 7:
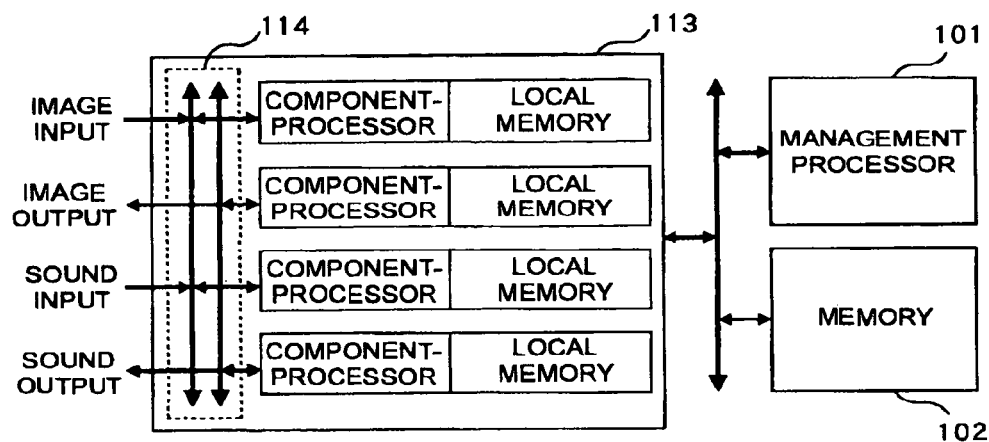
FIG. 7 is a diagram showing another structural example of the signal processing device.
Figure 8:
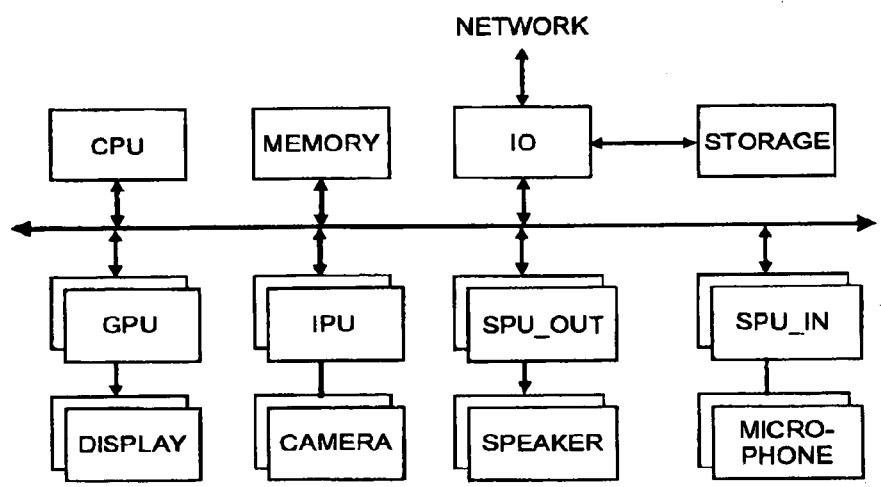
FIG. 8 is a structural diagram showing a conventional home server.

This embodiment is exemplified by an example using the cross bar 104 as the input/output interface. Alternatively, as shown in FIG. 7, a multiple bus 114 may be used as the cross bar 104. The multiple bus 114 is so designed as to selectively connect an external device to any one of the component-processors, or the component-processors to each other in accordance with the designation of an address. In FIG. 7, reference numeral 113 denotes a general-purpose signal processor made up of plural component-processors to each of which the above-mentioned large-capacity local memory is added.

Also, this embodiment is exemplified by a case in which one signal processing device is formed of four component-processors. However, the number of component-processors can be arbitrarily changed in accordance with the maximum value of a performance required for entertainment processing.

Further, this embodiment is exemplified by the home server 1. However, the same is applicable to other entertainment devices such as a set-top box. Also, the signal processing device according to the present invention can be mounted on not only the entertainment device but also a general information processing device.

As was apparent from the above description, according to the present invention, there can be provided an entertainment device and a signal processing device which can execute plural kinds of processing with high efficiency and high reliability.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A signal processing device, comprising:
a general-purpose signal processor formed of a plurality of component-processors, each of the component-processors operates in parallel under a plurality of configurations of operating environments and a plurality of configurations of input/output connections of the plurality of component-processors associated with a plurality of software tasks, each of the component-processors operates independently from other component-processors;
a management processor, based on a request for a job provided from a main processor,
the management processor:
selects a number of component-processors to operate and configures the input/output connections of the selected component-processors from the plurality of component-processors, and
assigns and loads software tasks into the selected component-processors in response to a demand for signal processing of the job calculated by using an estimated load of an entire processing of the job and a content type of each of the software tasks; comprised in the job and
controls an input/output interface to swap one of the component-processors which receives the signal to be processed or outputs the processed signal in accordance with the demand for signal processing,
wherein the input/output interface:
relays signals between the component-processors,
receives receiving signals to be processed, inputted from one or more external peripheral devices connected to the input/output interface and
outputs processed signals to the one or more external peripheral devices,
wherein a type of each external peripheral device is recognized by the input/output interface,
wherein each of the component-processors executes only an assigned type of a software task of the plurality of software tasks corresponding to an assigned external peripheral device until another demand for signal processing is received from the management processor,
wherein the input/output interface is a crossbar that selectively connects the selected component-processors to each other based on input/output connections configured between the selected component-processors for performing the job, and
wherein each of the component-processors, when the plurality of software tasks are simultaneously executed, executes the software task assigned to the respective component-processors, until another demand is given from the management processor.

2. The signal processing device as claimed in claim 1, wherein the crossbar can selectively connect, under the control of the management processor, each of the one or more external peripheral devices to one of the component-processors.

3. The signal processing device as claimed in claim 1, wherein a local memory is disposed on each of the component-processors, said local memory stores the signal to be processed or a signal processed result by the component-processors until the signal to be processed or the signal processed result becomes available to be outputted to the input/output interface.

4. The signal processing device as claimed in claim 1, wherein the general-purpose signal processor, the management processor, and the input/output interface are disposed in a single case.

5. An entertainment device, comprising:

a signal processing device including a general-purpose signal processor, a management processor, and an input/output interface; and a main processor that provides a demand for signal processing to the signal processing device, wherein the general-purpose signal processor is formed of a plurality of component-processors, each of the component-processors operates in parallel under a plurality of operating environments and a plurality of configurations of input/output connections of the plurality of component-processors, each of the component-processors operates independently from other component-processors;

the input/output interface relays signals between the component-processors, receives signals to be processed from one or more external peripheral devices connected to the entertainment device, and outputs processed signals to the one or more external peripheral devices, wherein a type of each external peripheral device is recognized by the input/output interface, the management processor, based on a request for a job provided from the main processor:

selects a number of the component-processors to operate and configures the input/output connections of the selected component-processors from the plurality of component-processors, assigns and loads software tasks into the selected component-processors in response to the demand for signal processing of the job provided from the main processor, and estimates the demand for signal processing of the job based on a content type of each of the software tasks comprised in the job and an estimated load of an entire processing of the job, wherein the number of component-processor selected is based on the estimated demand for signal processing, controls the input/output interface to swap one of the component-processors which receives the signal to be processed or outputs the processed signal in accordance with the demand for signal processing, wherein each of the component-processors executes only an assigned type of a software task of a plurality of software tasks until another demand for signal processing is received from the management processor, wherein the input/output interface is a crossbar that selectively connects the selected component-processors to each other based on input/output connections configured between the selected component-processors for performing the job, and wherein each of the component-processors, when the plurality of software tasks are simultaneously executed, executes software tasks assigned to the respective component-processors, until another demand is given from the management processor.

6. The entertainment device as claimed in claim 5, further comprising a network interface that enables a connection with a computer network, and a storage means that stores digital information readable by a computer, wherein the main processor controls the network interface to acquire the digital information from one of the one or more external peripheral devices, stores the acquired digital information in the storage means, and provides the stored digital information and the demand for signal processing based on the digital information to the management processor of the signal processing device to constitute operating environments for entertainment processing the contents of which are determined in accordance with the digital information.

7. The entertainment device as claimed in claim 6, wherein the main processor constructs the operating environments for entertainment processing on one or more of the component-processors through the management processor, and, after constructing the operating environments, said main processor reconstructs said operating environments to new operating environments upon receipt of another digital information which differs from said digital information.

8. The signal processing device according to claim 1, wherein each of the plurality of component-processors is formed of the same hardware structure.

9. The entertainment device according to claim 5, wherein each of the plurality of component-processors is formed of the same hardware structure.

* * * * *